United States Patent [19]

Fujita et al.

[11] Patent Number: 5,383,110
[45] Date of Patent: Jan. 17, 1995

[54] METHOD OF PROGRAMMING PRIMARY AND SECONDARY MACHINING OPERATIONS USING AN INTERACTIVE NUMERICAL CONTROL APPARATUS

[75] Inventors: Naoki Fujita; Teruyuki Matsumura; Hideaki Maeda, all of Yamanashi, Japan

[73] Assignee: Fanuc Ltd., Minamitsuru, Japan

[21] Appl. No.: 776,226

[22] PCT Filed: Mar. 7, 1991

[86] PCT No.: PCT/JP91/00328
§ 371 Date: Nov. 13, 1991
§ 102(e) Date: Nov. 13, 1991

[87] PCT Pub. No.: WO91/14216
PCT Pub. Date: Sep. 19, 1991

[30] Foreign Application Priority Data

Mar. 15, 1990 [JP] Japan ................................. 2-65284

[51] Int. Cl.⁶ ...................... G05B 19/42; G06F 15/46
[52] U.S. Cl. .............................. 364/191; 364/474.22; 364/474.27; 364/474.21
[58] Field of Search ...................... 364/474.22–474.27, 364/191, 474.11, 188–190, 192–193; 82/118, 119, 120, 121, 129; 318/568.1, 625; 567, 569, 574

[56] References Cited

U.S. PATENT DOCUMENTS

| | | | |
|---|---|---|---|
| 4,723,203 | 2/1988 | Kishi et al. | 364/474.22 |
| 4,723,207 | 2/1988 | Isobe et al. | 364/474.22 |
| 4,814,999 | 3/1989 | Kawamura et al. | 364/474.22 |
| 4,823,253 | 4/1989 | Shima et al. | 364/474.22 |
| 4,926,311 | 5/1990 | Matsumura et al. | 364/474.22 |
| 4,979,121 | 12/1990 | Inoue et al. | 364/474.11 |
| 4,994,514 | 12/1988 | Hidenki et al. | 364/474.22 |

FOREIGN PATENT DOCUMENTS

0345355  12/1989  European Pat. Off. .
63215764  3/1990  Japan .

*Primary Examiner*—James Trammell
*Attorney, Agent, or Firm*—Staas & Halsey

[57] ABSTRACT

An interactive numerical control apparatus is programmed by inputting data through keys on a control panel, and answering questions displayed on a display screen, to generate a numerical control program. The operator defines a blank shape and a part shape (steps S1, S2), and selects a primary machining operation or a secondary machining operation (step S3). A cutting region for the primary machining operation is defined in the same manner as with an ordinary two-axis lathe. For the secondary machining operation, the blank and part shapes are displayed in reverse (step S6), and a cutting region for the secondary machining operation is defined in the same manner as the cutting region for the primary machining operation is defined (step S7). Based on the necessary data and machining conditions that are defined, the interactive numerical control apparatus outputs numerical control data separately for the respective primary and secondary machining operations (step S8).

1 Claim, 11 Drawing Sheets

```
┌─ 54
│  ┌─────────────────────────────────────────────────────────┐
│  │ MACHINING        CUTTING CONDITIONS   (PRIMARY MACHINING│
│  │ DEFINITION                                  OPERATION)  │
│  │                                                         │
│  │ MACHINING        ROUGH PROFILE                          │
│  │ TYPE 02          MACHINING                              │
│  │                                                         │
│  │ CLEARANCE        · · · · CX =                           │
│  │ FINISHING                                               │
│  │ ALLOWANCE        · · · · TX =                           │
│  │ CUTTING DEPTH    · · · ·  D =                           │
│  │ CUTTING SPEED    · · · ·  V =                           │
│  │ FEEDING SPEED    · · · · FI =                           │
│  │                                                         │
│  │       ·                                                 │
│  │       ·                                                 │
│  │       ·                                                 │
│  │                                                         │
│  │ SELECT WITH SOFT KEYS                                   │
│  ├────────┬────────┬────────┬────────┬────────┬────────────┤
│  │ CANCEL │PREVIOUS│        │        │        │ NEXT       │
│  │        │ PAGE   │        │        │        │ PAGE       │
│  └────────┴────────┴────────┴────────┴────────┴────────────┘
```

METHOD OF PROGRAMMING PRIMARY AND SECONDARY MACHINING OPERATIONS USING AN INTERACTIVE NUMERICAL CONTROL APPARATUS

BACKGROUND OF THE INVENTION

1. Field of the Invention

The present invention relates to a method of programming an interactive numerical control apparatus, and more particularly to a method of programming an interactive numerical control apparatus for simultaneous generation of numerical control (NC) data for primary and secondary machining operations.

2. Description of the Related Art

When interactive numerical control apparatus are to be programmed, the operator Inputs numerical data in answer to questions as to necessary items according to a procedure, or selects a desired Item from a displayed menu. Such an interactive programming method is widely used to generate machining programs for various numerically controlled machine tools because it allows even novice operators to generate the programs by using data from drawing figures and other sources.

Some interactive numerical control apparatus employ symbolic keys for entering shape elements to input blank and part shapes. Specifically, the shape of a part is inputted using horizontal lines, vertical lines, oblique lines, and arcs to generate a machining program. The use of such symbolic keys allows part shapes to be inputted easily for efficient generation of NC programs.

Computerized, numerically controlled lathes with a plurality of machining heads for higher machining efficiency include a two-spindle, two turret four-axis lathe having two parallel spindles. Usually, a workpiece is machined by the two-spindle, two-turret four-axis lathe such that one end of the workpiece, which is held by one of the heads, is machined in a primary machining operation, and thereafter the workpiece is held by the other head and its opposite end is machined in a secondary machining operation (which may also be referred to as a backward machining operation).

Figure 11:
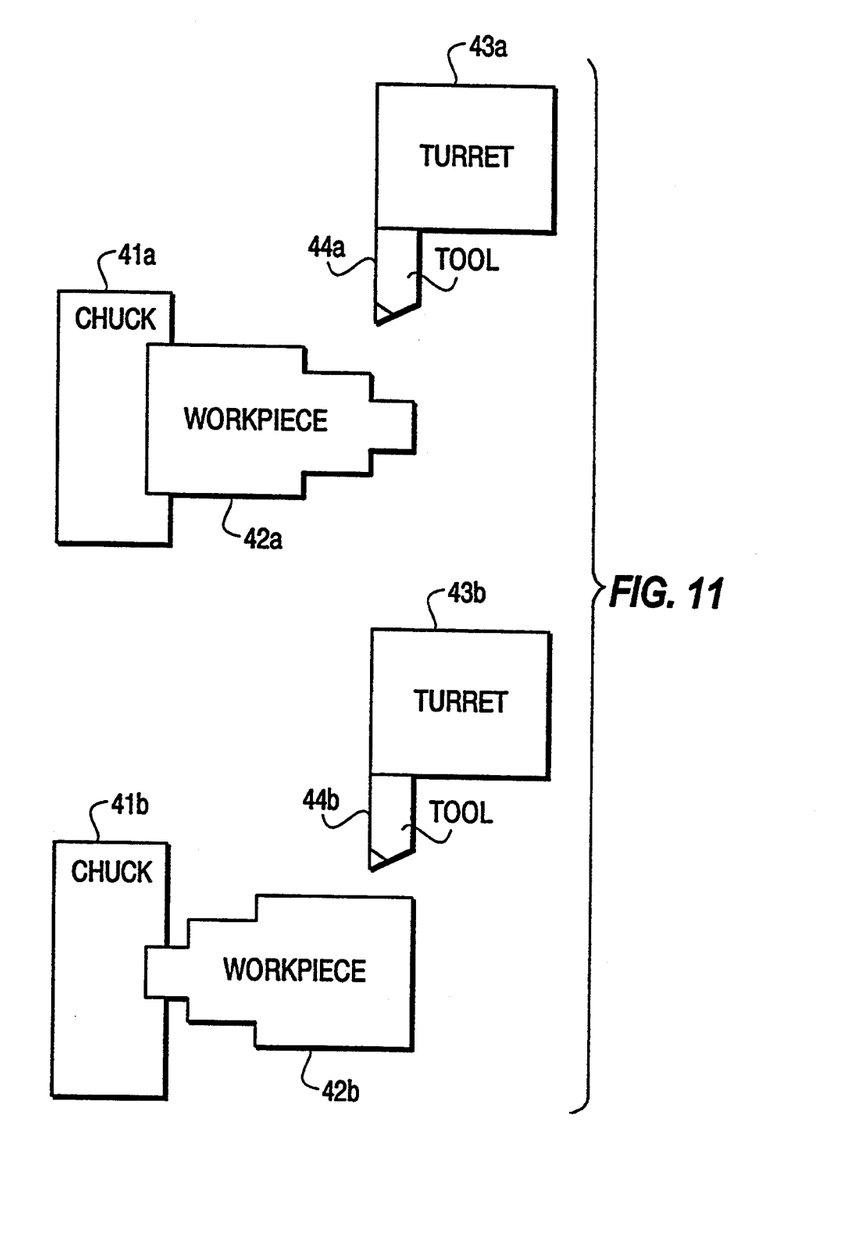
FIG. 11 is a schematic view illustrative of a two-spindle, two-turret four-axis lathe.

FIG. 11 of the accompanying drawings schematically shows the manner in which a workpiece is machined by a two-spindle, two-turret four-axis lathe. First, a workpiece 42a held by a chuck 41a is machined to a desired shape by a tool 44a mounted on a turret 43a in a primary machining operation. Then, the machined workpiece 42a is released from the chuck 41a and held, as a workpiece 42b, by another chuck 41b. The workpiece 42b held by the chuck 41b is machined to a desired shape by a tool 44b mounted on a turret 43b in a secondary machining operation.

According to the conventional method of programming interactive numerical control apparatus, NC data for a primary machining operation and NC data for a secondary machining operation are generated separately from each other. Therefore, the interactive numerical control apparatus must be programmed separately on the NC data for the primary and secondary machining operations even if one final part shape is to be achieved. Such a programming process has been inefficient to carry out.

SUMMARY OF THE INVENTION

In view of the aforesaid drawbacks of the conventional method of programming interactive numerical control apparatus, it is an object of the present invention to provide a method of programming an interactive numerical control apparatus by defining a final part shape and producing NC data automatically separately for respective primary and secondary machining operations.

To achieve the above object, there is provided in accordance with the present invention a method of programming an interactive numerical control apparatus by inputting data through keys, which correspond to a machined shape, on a control panel, and answering questions displayed on a display screen, to generate a numerical control program, the method comprising the steps of defining a blank shape and a part shape, indicating a primary machining operation or a secondary machining operation for a machining type to be defined, defining a cutting region for the indicated primary or secondary machining operation, and outputting numerical control data separately for the respective primary and secondary machining operations, based on the defined part shape, the defined machining type, and the defined cutting region.

The operator first defines the blank and part shapes, and indicates primary and secondary machining operations for a selected machining type, or only a primary machining operation with no secondary machining operation. If there is a secondary machining operation selected, a cutting region for the primary machining operation is defined in the same manner as with an ordinary two-axis lathe. For the secondary machining operation, the blank and part shapes are displayed in reverse, and a cutting region for the secondary machining operation is defined in the same manner as the cutting region for the primary machining operation is defined. Based on the necessary data and machining conditions that are defined, the interactive numerical control apparatus outputs numerical control data separately for the respective primary and secondary machining operations.

DESCRIPTION OF THE PREFERRED EMBODIMENT

An embodiment of the present invention will hereinafter be described with reference to the drawings.

Figure 2:
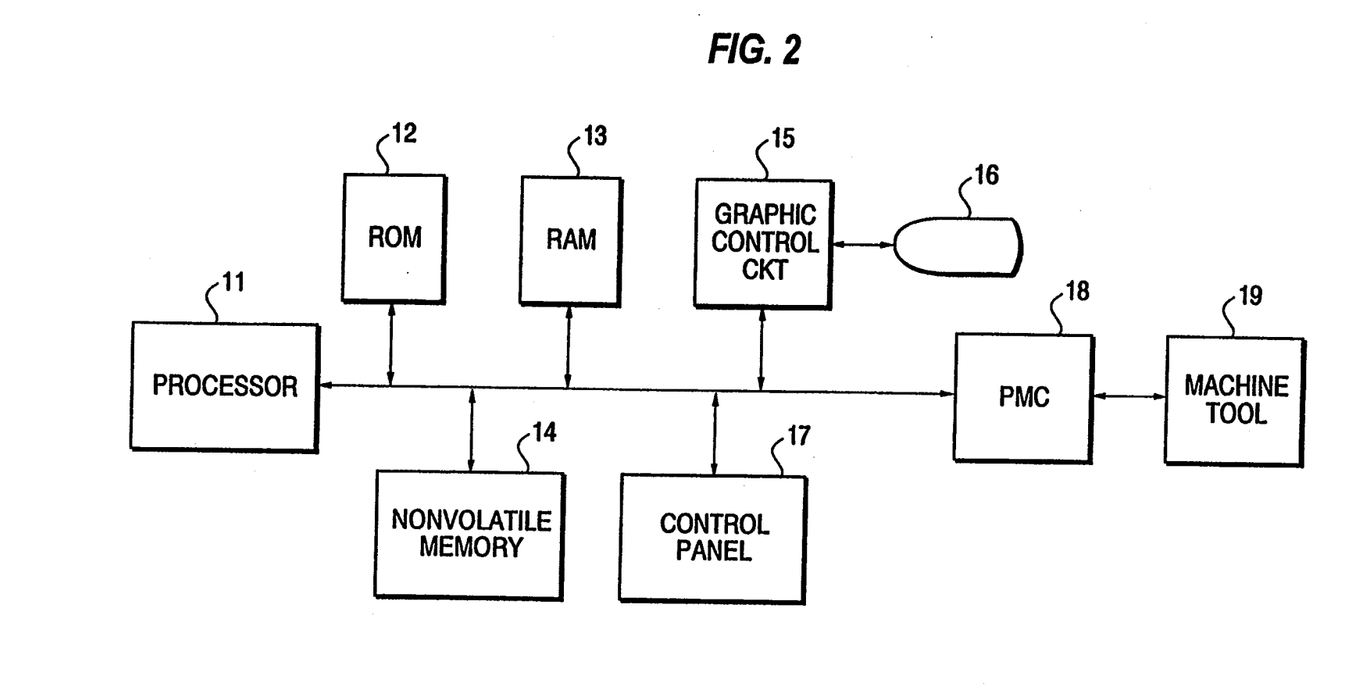
FIG. 2 is a block diagram of a hardware arrangement of a numerical control apparatus to which the present invention is applied.

FIG. 2 schematically shows a hardware arrangement of a numerical control apparatus to which the present invention is applied. The numerical control apparatus includes a processor 11 for controlling the numerical control apparatus in its entirety according to a system program that is stored in a ROM 12. The ROM 12 may comprise an EPROM or an EEPROM. The numerical control apparatus also includes a RAM 13 such as an SRAM for storing various data and input/output signals, and a nonvolatile memory 14 such as CMOS backed up by a battery, for storing parameters, pitch error compensation values, and tool compensation values that should remain stored after the power supply of the numerical control apparatus is turned off.

A graphic control circuit 15 converts a digital signal into a display signal, and applies the display signal to a display unit 16. The display unit 16, which may comprise a CRT or a liquid crystal display unit, displays axis positions, input/output signal statuses, parameters, etc. A control panel 17 such as a keyboard or the like is used to input various data or control a machine tool 19.

A PMC (Programmable Machine Controller) 18 receives an output signal over a bus 20, and processes the output signal according to a sequence program to control the machine tool 19. The PMC 18 also receives an input signal from the machine tool 19, processes the input signal according to the sequence program, and transfers the processed signal to the processor 11 over the bus 20.

The above components of the numerical control apparatus are interconnected by the bus 20.

Various other components including servoamplifiers, servomotors, spindle amplifiers, and spindle motors are omitted from illustration in FIG. 2. Instead of the single processor 11, a plurality of processors may be employed as a multiprocessor system.

Figure 3:
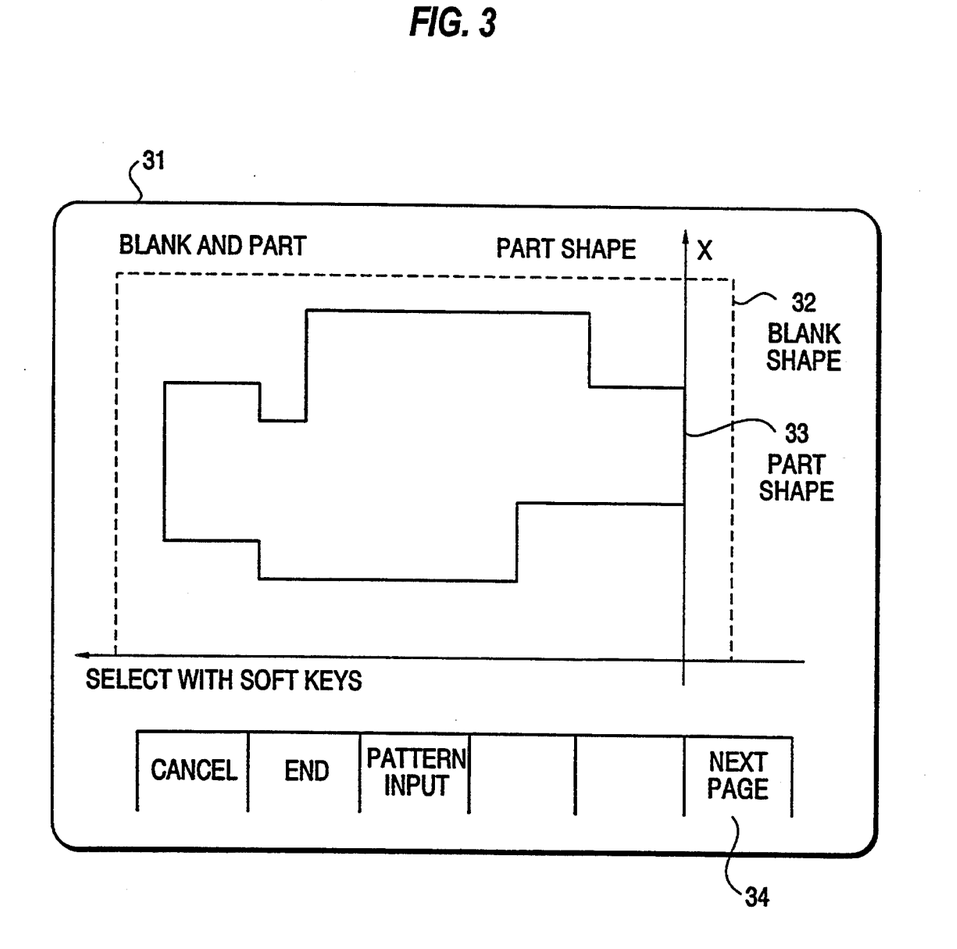
FIG. 3 is a view showing a display screen of an interactive numerical control apparatus, the display screen displaying a blank shape and a part shape.

FIG. 3 illustrates a display screen of an interactive numerical control apparatus, the display screen displaying a blank shape and a part shape. The display screen, indicated by 31, displays a blank shape 32 represented by the dotted lines and a part shape 33 represented by the solid lines. The blank shape 32 and the part shape 33 are entered and defined by the operator, either using symbolic keys on the control panel 17 or in answer to questions displayed on the display screen. When the blank shape 32 and the part shape 33 are to be defined, it is not necessary for the operator to be concerned with primary and secondary machining operations, but only to define a final part shape. After the data of the blank shape 32 and the part shape 33 have been entered, the operator presses a soft key 34 for a next page to go to a next display screen.

Figure 4:
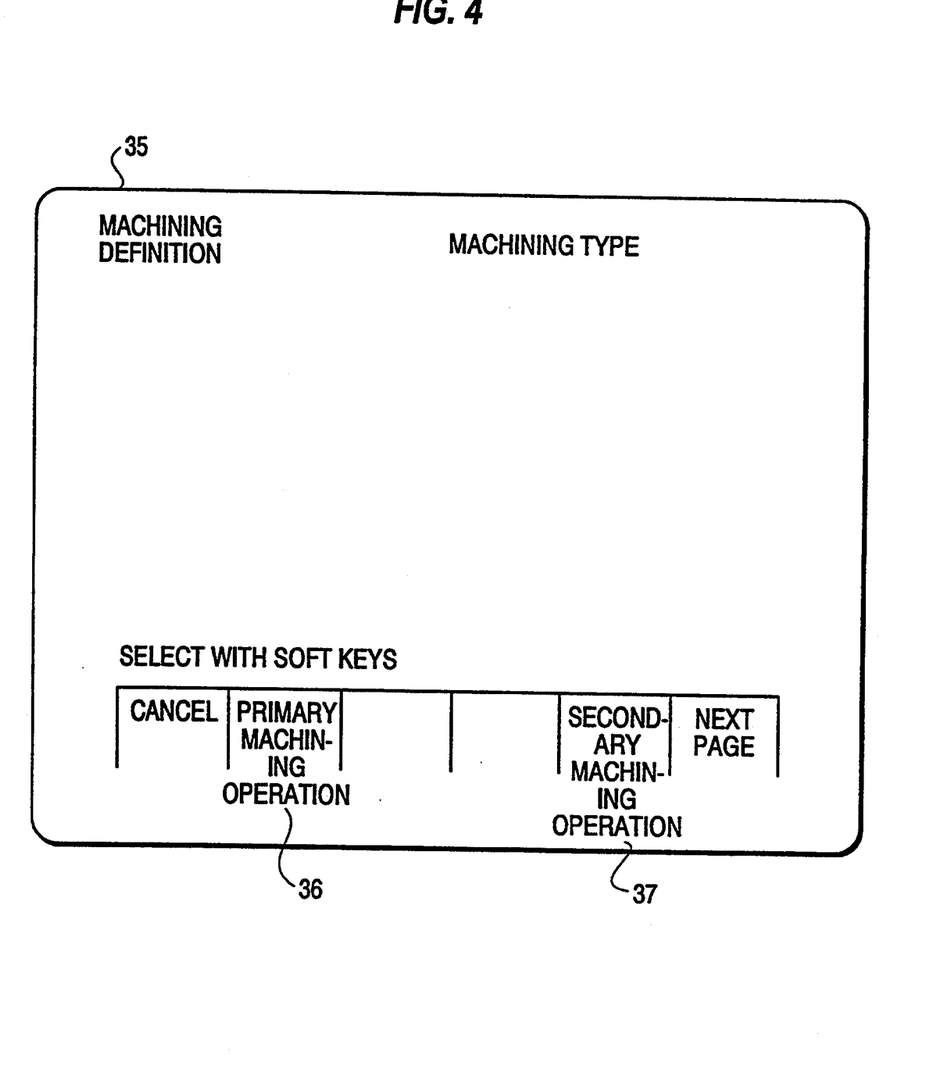
FIG. 4 is a view showing a display screen of the interactive numerical control apparatus, the display screen displaying soft keys for selecting primary and secondary machining operations.

FIG. 4 shows a display screen of the interactive numerical control apparatus, the display screen displaying soft keys for selecting primary and secondary machining operations. The display screen, indicated by 35, displays soft keys 36, 37 for selecting primary and secondary machining operations to define a machining type. To select the primary machining operation, the operator presses the soft key 36 for the primary machining operation. To select the secondary machining operation, the operator presses the soft key 37 for the secondary machining operation. When the soft key 37 for the secondary machining operation is pressed, the message "SECONDARY MACHINING" should preferably be displayed for the convenience of the operator in the subsequent control process.

Figure 5:
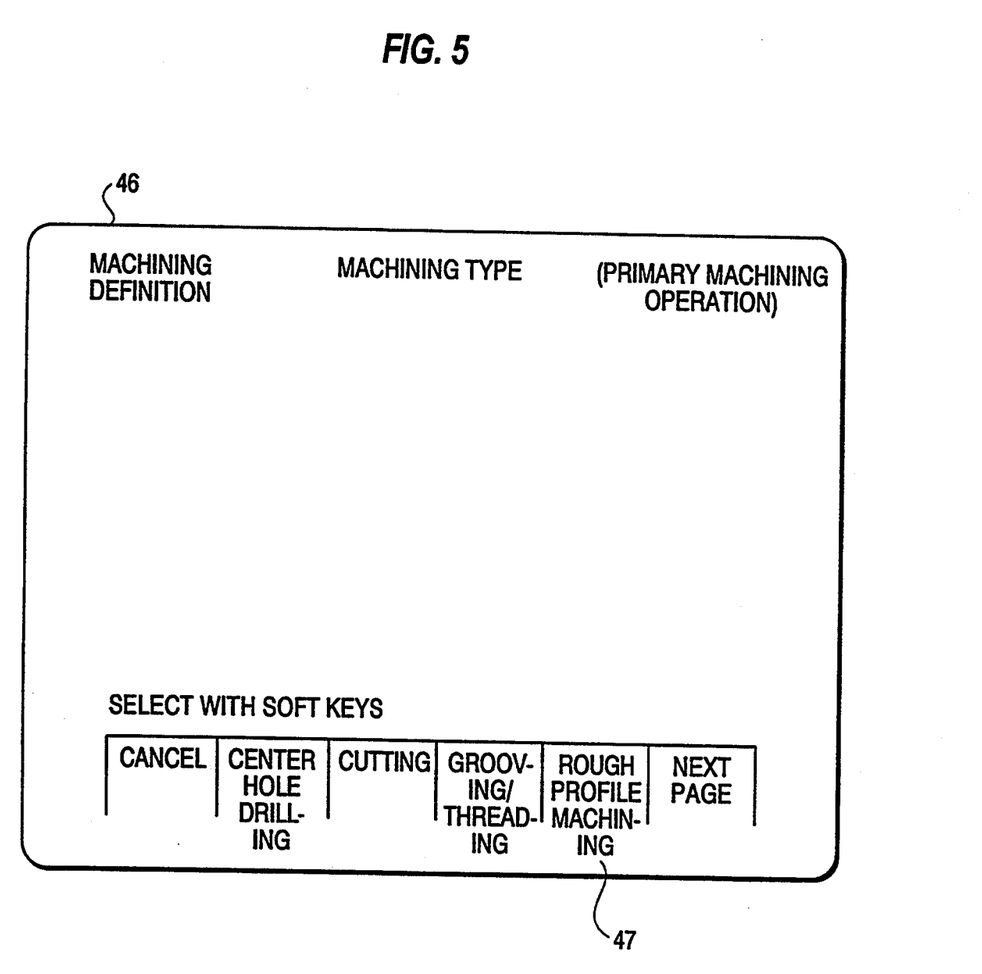
FIG. 5 is a view showing a display screen of the interactive numerical control apparatus, the display screen displaying soft keys for selecting machining types.

FIG. 5 shows a display screen of the interactive numerical control apparatus, the display screen displaying soft keys for selecting machining types. A desired machining type can be selected and defined by one of soft keys displayed on the display screen, indicated by 46. In FIG. 5, a rough profile machining type is selected by a soft key 47.

Figure 6:
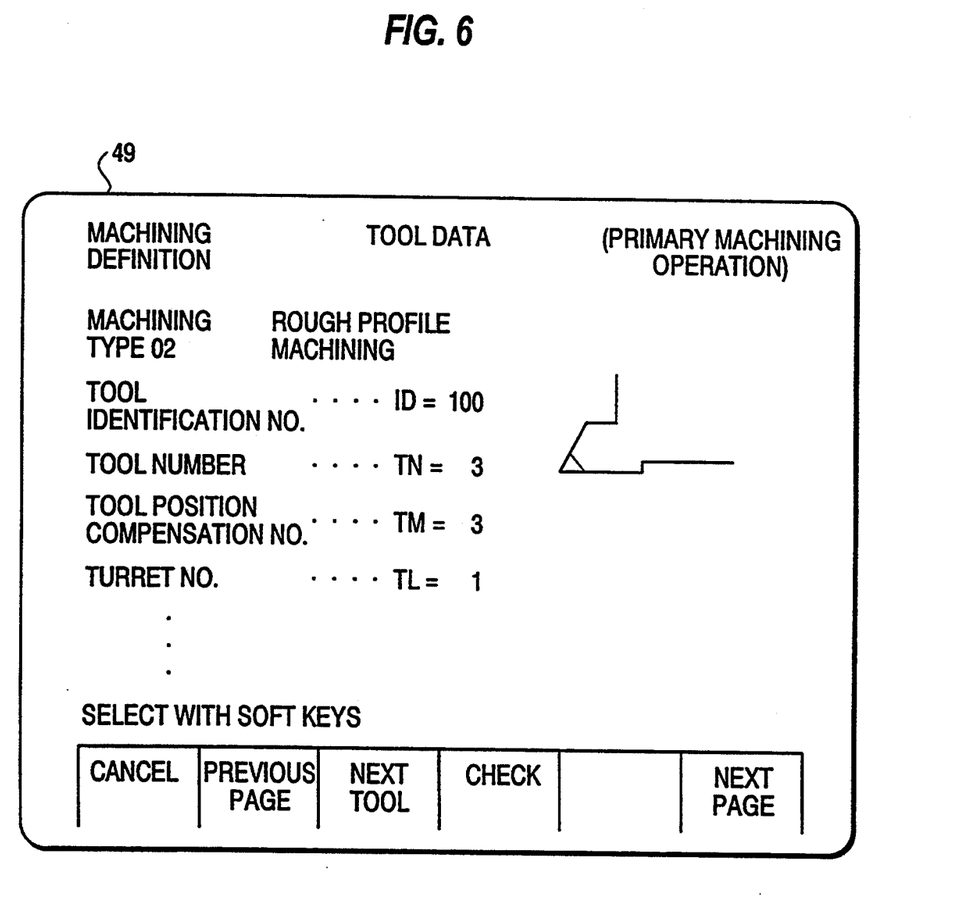
FIG. 6 is a view showing a display screen of the interactive numerical control apparatus, the display screen displaying tool data.

FIG. 6 shows a display screen of the interactive numerical control apparatus, the display screen displaying tool data. The operator inputs tool data in answer to questions displayed on the display screen, indicated by 49. Depending on the selected machining type, registered tool data are automatically displayed when the operator inputs a tool identification number.

Figure 7:
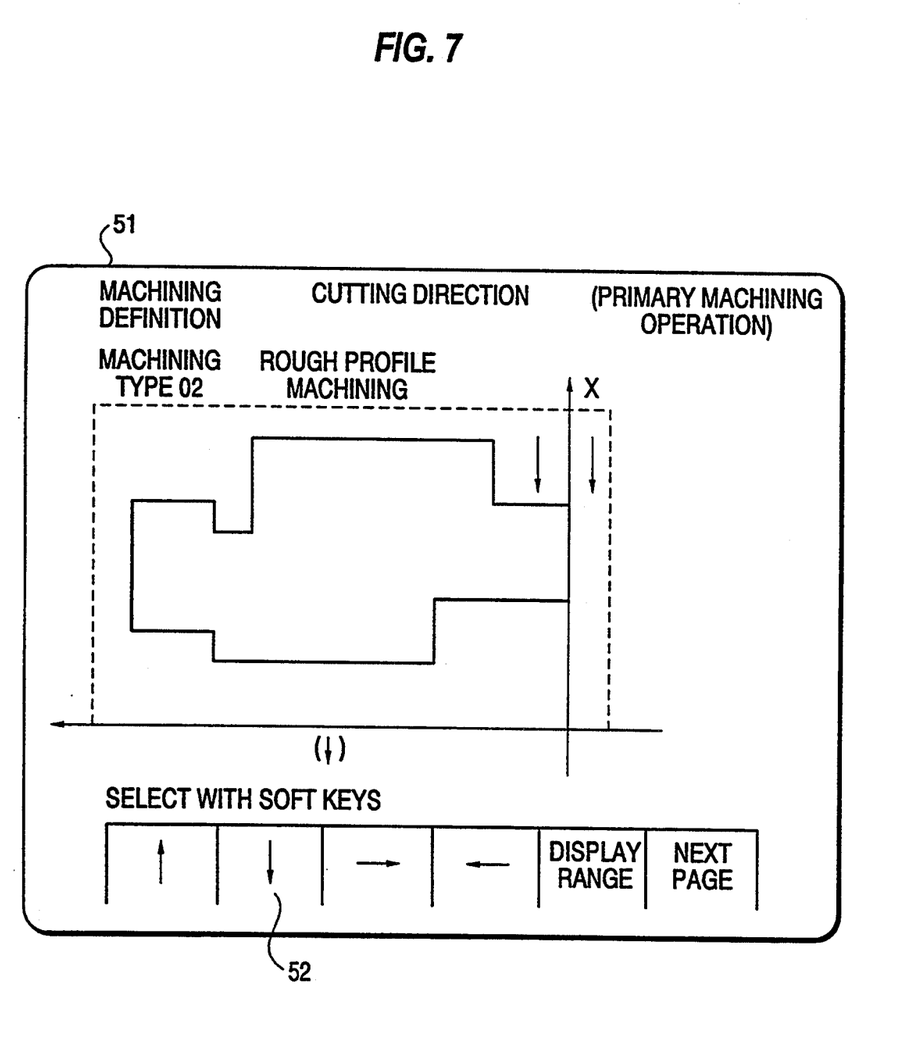
FIG. 7 is a view showing a display screen of the interactive numerical control apparatus, the display screen displaying a cutting direction.

FIG. 7 shows a display screen of the interactive numerical control apparatus, the display screen displaying a cutting direction. A cutting direction is inputted by the operator using ten numeric keys on the control panel 17 or soft keys displayed on the display screen, indicated by 51. In FIG. 7, a downward cutting direction is selected by a soft key 52 with a downward arrow on the display screen 51.

Figure 8:
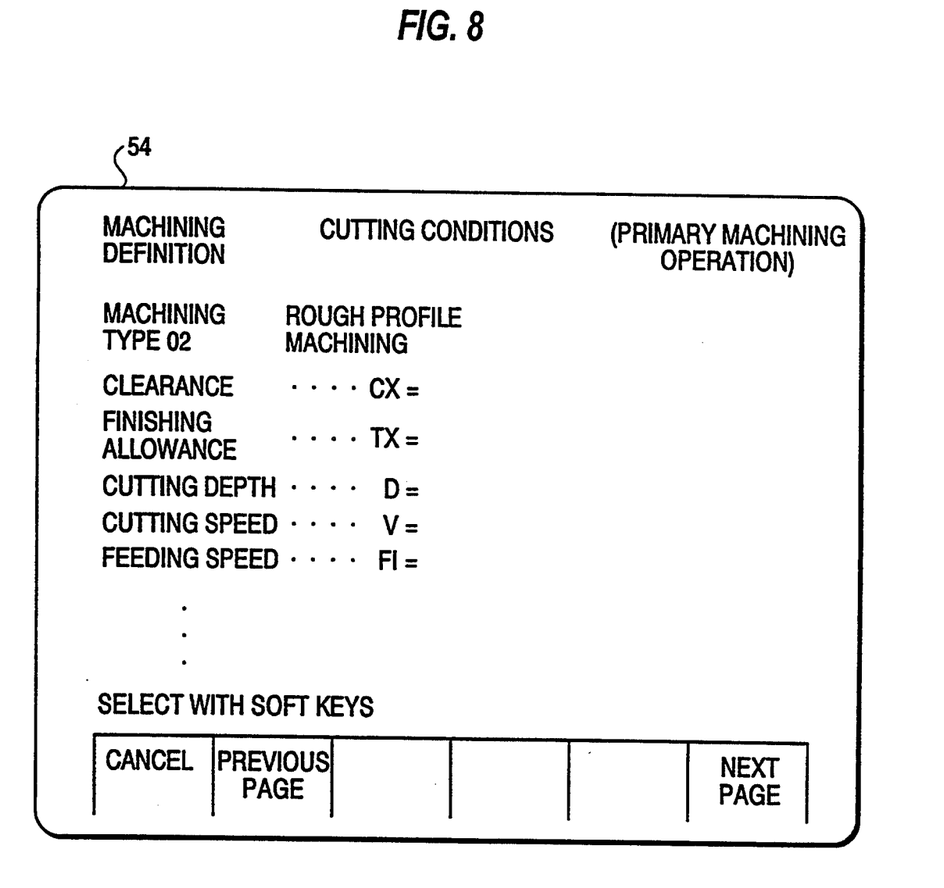
FIG. 8 is a view showing a display screen of the interactive numerical control apparatus, the display screen displaying cutting conditions.

FIG. 8 shows a display screen of the interactive numerical control apparatus, the display screen displaying cutting conditions. Cutting conditions of a machining step are displayed on the display screen, indicated by 64. The displayed cutting conditions may be corrected as necessary.

Figure 9:
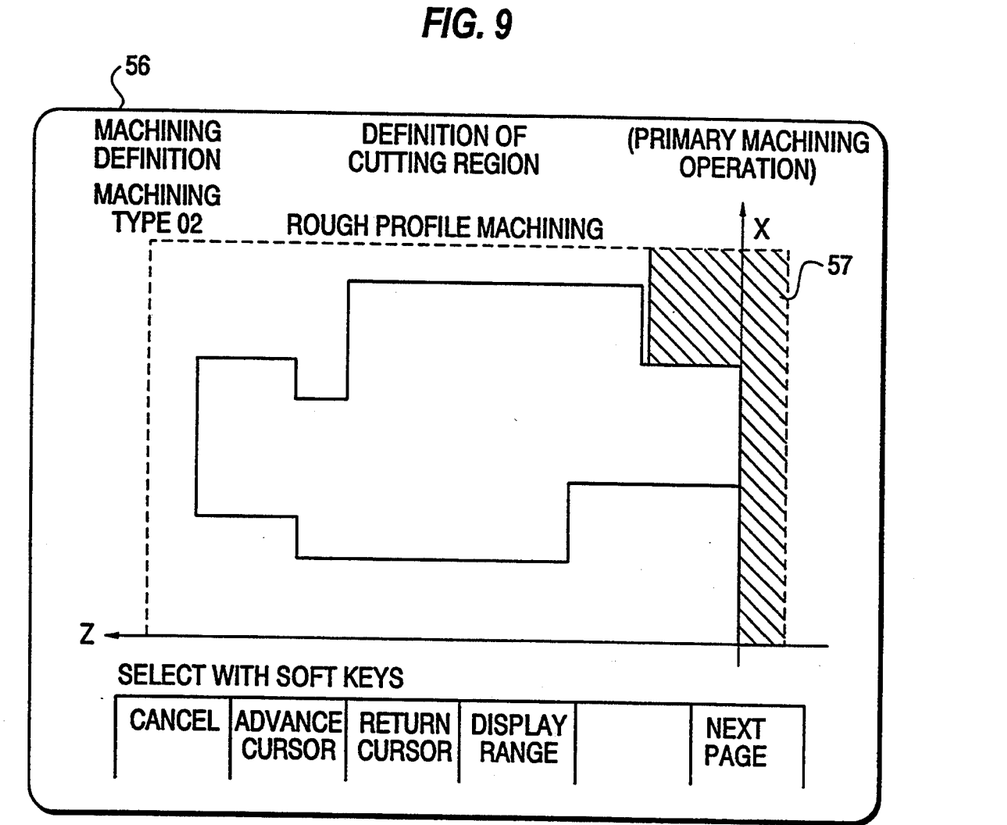
FIG. 9 is a view showing a display screen of the interactive numerical control apparatus, the display screen displaying a cutting region.

FIG. 9 shows a display screen of the interactive numerical control apparatus, the display screen displaying a cutting region. The display screen, indicated by 56, displays a blank shape represented by the dotted lines and a machined shape (part shape) represented by the solid line. In answer to a displayed question as to a direction of division, the operator moves two blinking cursors (not shown) on the display screen to indicate machining starting and ending positions on the displayed machined part. A hatched region 57 is indicated by the cursors, and will be cut off in a rough profile machining process, which is a primary machining operation.

Figure 10:
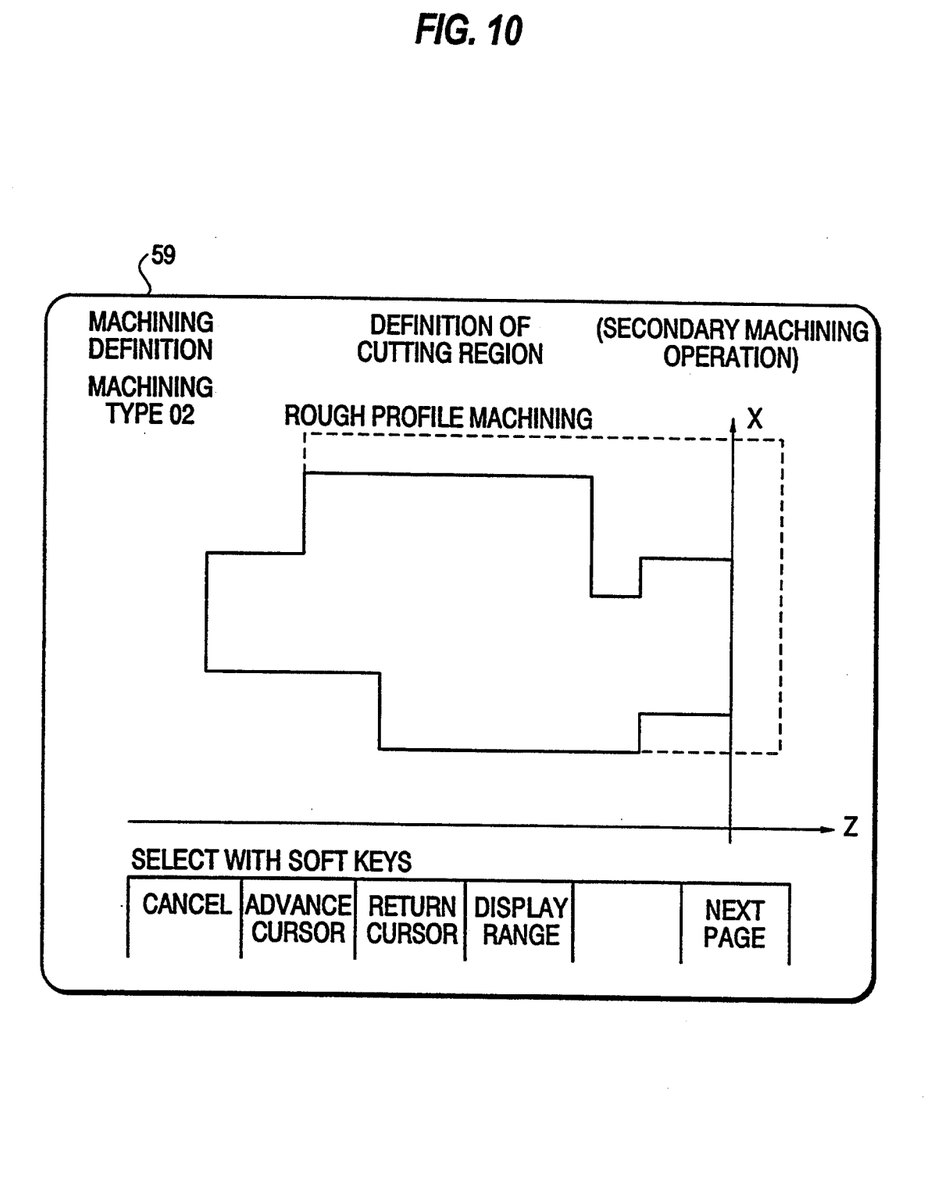
FIG. 10 is a view showing a display screen of the interactive numerical control apparatus, the display screen displaying a cutting region in a secondary machining operation.

FIG. 10 shows a display screen of the interactive numerical control apparatus, the display screen displaying a cutting region in a secondary machining operation. The display screen, indicated by 59, also displays a blank shape and a part shape, but differs from the display screen 56 shown in FIG. 9 in that the blank and part shapes are displayed in reverse, i.e., as though rotated 180° about a vertical axis in the plane of the display, to facilitate the definition of a cutting region in a secondary machining operation. A cutting region in a secondary machining operation is displayed upon selection of the secondary machining operation in the definition of a machining type as shown in FIG. 4.

Figure 1:
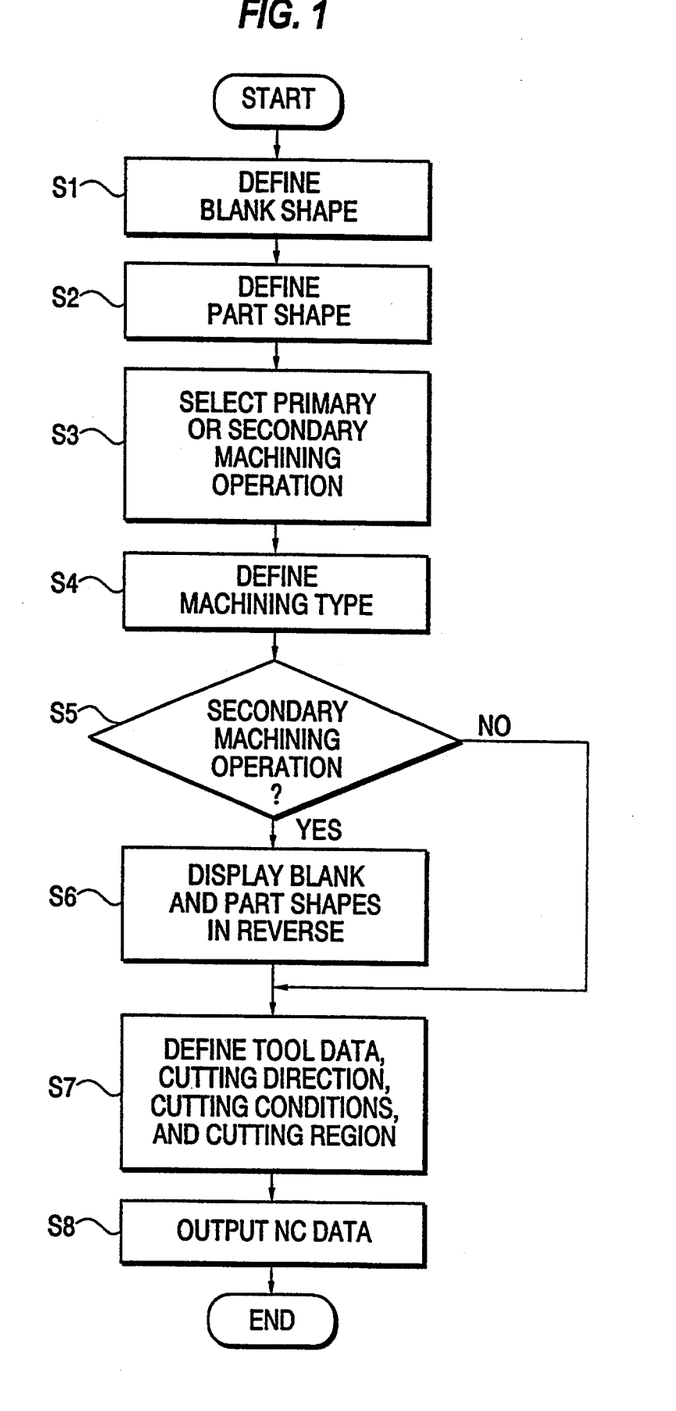
FIG. 1 is a flowchart of a programming method according to the present invention.

FIG. 1 is a flowchart of a programming method according to the present invention. The numerals following the letter "S" below indicate step numbers.

[S1] A blank shape is defined.
[S2] A final part shape is defined (see FIG. 3).
[S3] A primary machining operation or a secondary machining operation is selected (see FIG. 4).
[S4] A machining type is defined. In the illustrated embodiment, a rough profile machining process is selected (see FIG. 5).
[S5] This step determines whether a primary machining operation or a secondary machining operation has been selected. If the secondary machining operation has been selected, then control goes to a step S6, and if the primary machining operation has been selected, then control jumps to a step S7. The step S5 is automatically carried out in the programming apparatus based on the selection made in the step S3.
[S6] If the secondary machining operation is indicated, the blank and part shapes are displayed in reverse. The step S6 is also automatically carried out in the programming apparatus.
[S7] Tool data, a cutting direction, cutting conditions (see FIGS. 6 through 8), and a cutting region are defined. If the primary machining operation has been selected, then a cutting region is defined along a machined shaped as shown in FIG. 9. If the secondary machining operation has been selected, then a cutting region is defined on the display screen as shown in FIG. 10, in which the blank and part shapes are displayed in reverse, in the same manner as when the primary machining operation has been selected.
[S8] First, NC data are outputted for the primary machining operation, and then NC data are outputted for the secondary machining operation.

While the method of programming an interactive numerical control apparatus has been described in the above embodiment, the present invention is also applicable to a programming method for an automatic programming apparatus.

With the present invention, as described above, a part shape is defined, a primary machining region and then a secondary machining region are defined, and NC data are outputted separately for respective primary and secondary machining operations. The method of the present invention makes a programming process much more efficient than if an interactive numerical control apparatus were programmed separately on the NC data for the primary and secondary machining operations regardless of one final part shape to be achieved.

What is claimed is:
1. A method of programming an interactive numerical control apparatus by inputting data corresponding to a machined shape, using keys on a control panel and answering questions displayed on a display screen, to generate a numerical control program, said method comprising the steps of:
 (a) defining a blank shape and a part shade;
 (b) selecting one of a primary machining operation on a first spindle and a secondary machining operation on a second spindle for a machining type of a process to be defined;
 (c) defining a cutting region for the one of the primary and secondary machining operations selected in step (b);
 (d) displaying the blank shape and the part shape for the primary machining operation prior to said defining in step (c);
 (e) displaying the blank shape and the part shape in reverse of said displaying in step (d), after said selecting in step (b) selects the secondary machining operation and before said defining of the cutting region for the secondary machining operation in step (c); and
 (f) outputting numerical control data separately for the primary and secondary machining operations, based on the part shape, the machining type, and the cutting region defined in steps (a)–(c).

* * * * *

UNITED STATES PATENT AND TRADEMARK OFFICE
CERTIFICATE OF CORRECTION

PATENT NO. : 5,383,110
DATED      : January 17, 1995
INVENTOR(S): Naoki Fujita et al.

It is certified that error appears in the above-identified patent and that said Letters Patent is hereby corrected as shown below:

Col. 1, line 8, delete "1."; and line 15, delete "2.".

Col. 4, line 40, "64" should be --54--.

Col. 5, line 9, "embodiment" should be --example--; and line 29, "shaped" should be --shape--.

Signed and Sealed this

Twenty-eight Day of March, 1995

Attest:

BRUCE LEHMAN

Attesting Officer        Commissioner of Patents and Trademarks